United States Patent
Bergamini et al.

(10) Patent No.: US 9,890,874 B2
(45) Date of Patent: Feb. 13, 2018

(54) MULTISTAGE TRIM FOR CONTROL VALVES

(71) Applicant: Nuovo Pignone Srl, Florence (IT)

(72) Inventors: Lorenzo Bergamini, Bari (IT); Vincenzo Pietanza, Florence (IT)

(73) Assignee: Nuovo Pignone Srl, Florence (IT)

(*) Notice: Subject to any disclaimer, the term of this patent is extended or adjusted under 35 U.S.C. 154(b) by 0 days.

(21) Appl. No.: 15/036,680

(22) PCT Filed: Nov. 14, 2014

(86) PCT No.: PCT/EP2014/074571
§ 371 (c)(1),
(2) Date: May 13, 2016

(87) PCT Pub. No.: WO2015/071398
PCT Pub. Date: May 21, 2015

(65) Prior Publication Data
US 2016/0281880 A1   Sep. 29, 2016

(30) Foreign Application Priority Data

Nov. 15, 2013 (IT) .............................. CO2013A0060

(51) Int. Cl.
*F16K 47/08* (2006.01)
*F16K 11/07* (2006.01)

(52) U.S. Cl.
CPC .............. *F16K 47/08* (2013.01); *F16K 11/07* (2013.01)

(58) Field of Classification Search
CPC .......... F16K 47/04; F16K 47/08; F16K 11/07; Y10T 137/86718; Y10T 137/86734;
(Continued)

(56) References Cited

U.S. PATENT DOCUMENTS 3,954,124 A * 5/1976 Self .......................... F16K 3/34
                                                        137/625.3
4,617,963 A    10/1986 Stares
(Continued)

FOREIGN PATENT DOCUMENTS

| CA | 1003727 A1 | 1/1977 |
| JP | 2009209976 A | 9/2009 |
| WO | 2012112845 A1 | 8/2012 |

OTHER PUBLICATIONS

Italian Search Report issued in connection with corresponding application CO2013A000060 dated Nov. 15, 2013.
(Continued)

*Primary Examiner* — Michael R Reid
(74) *Attorney, Agent, or Firm* — GE Global Patent Operation

(57) ABSTRACT

A control valve comprising a cylindrical hollow trim defining an inner bore extending along an axis between a first opening and a second opening, the first opening defining an inlet of the valve, the trim comprising a first outer cylinder extending along the axis and comprising a first plurality of radial through holes defining an outlet, a second cylinder, housed in the first cylinder and coaxial, the second cylinder comprising a second plurality of radial through holes, the holes of the first plurality being smaller and in greater number than the holes of the second plurality, for each hole of one of the first and second cylinders the projection along a radial direction on the other of the first and second cylinders being spaced from each hole of the other of the first and second plurality a plug sized to fit inside the bore and slidably movable along the axis.

6 Claims, 4 Drawing Sheets

(58) Field of Classification Search
CPC ..... Y10T 137/86759; Y10T 137/86791; Y10T 137/86799
USPC .............. 137/625.28, 625.3, 625.33, 625.37, 137/625.38; 251/118; 138/40, 43
See application file for complete search history.

(56) References Cited

U.S. PATENT DOCUMENTS

| | | | |
|---|---|---|---|
| 5,018,703 A * | 5/1991 | Goode | .................... F16K 47/08 137/625.3 |
| 6,766,826 B2 | 7/2004 | Baumann | |
| 6,886,596 B2 | 5/2005 | Tran | |
| 6,935,371 B2 | 8/2005 | Stares | |
| 6,973,941 B2 | 12/2005 | Baumann | |
| 2013/0320252 A1* | 12/2013 | Hageman | ................ F16K 3/246 251/324 |

OTHER PUBLICATIONS

International Search Report and Written Opinion issued in connection with corresponding PCT application PCT/EP2014/074571 dated Nov. 14, 2014.

* cited by examiner

MULTISTAGE TRIM FOR CONTROL VALVES

TECHNICAL FIELD

Embodiments of the present invention relate to a multistage control valve.

BACKGROUND

State of the art of multistage trim for control valves has many possible configurations. One of the most common types is composed by concentric drilled hollow cylinders.

This type of trim has several solutions. In a solution, shown in FIGS. 1A and 1B, the stroke is divided into separate axial levels. A central plug slides inside the most inner cylinder from one axial end, corresponding to the valve completely closed position, to the opposite axial end, corresponding to the valve completely open position, of the trim. Along its stroke, the plug progressively opens in series the axial levels of the valve, from the first to the last.

Another solution, is described in EP1408265. In this case, the central plug slides inside the most inner cylinder progressively opening a plurality of holes provided along the inner cylinder, an annular plenum being provided between the inner cylinder and a second outer cylinder provided with a second plurality of holes. The annular plenum communicates with all the holes of the inner and outer cylinders. Passing through the holes of the inner cylinder, a gas expands in the annular plenum and then exit the trim by passing through the holes in the outer cylinder.

Disadvantageous features of these solutions are, respectively to keep the velocity of the fluid under certain limits as the gas expands through the trim, the size of the holes must be increased going from the inlet to the outlet cylinders. This increases the noise at the last stage, corresponding to the most outer cylinder, of the trim. As the plug slides the distribution of the pressure drop among the stages is changed. In particular, at low valve openings, the first stage is subject to very high pressure loss and noise generation. In addition, the jets upstream of the last stage are not fully deviated and masked.

Similar inconveniences are present also in the solutions described in the documents CA1003727 and U.S. Pat. No. 4,617,963. It would be therefore desirable to provide an improved valve for which could maintain the advantages and avoid the inconveniences of both solutions above.

SUMMARY

Such an object is achieved through a control valve comprising a cylindrical hollow trim defining an inner bore extending along an axis between a first opening and a second opening, the first opening defining an inlet of the valve, the trim comprising a first outer cylinder extending along the axis and comprising a first plurality of radial through holes defining an outlet of the trim, a second cylinder, housed in the first cylinder and coaxial therewith, the second cylinder comprising a second plurality of radial through holes, a plug sized to fit inside the bore and slidably movable along the axis between a closed position proximal to the first opening and a complete open position proximal to the second opening, through a plurality of partially open positions, wherein in the complete open position all the holes of the first and second plurality of through holes are in communication with the inner bore and wherein in each of the partially open positions only a respective portion of holes of the first and second plurality of through holes are in communication with the inner bore, wherein the holes of the first plurality are smaller in diameter than the holes of the second plurality, the holes of the first plurality are in greater number than the holes of the second plurality, for each hole of one of the first and second cylinders the projection along a radial direction on the other of the first and second cylinders is spaced from each hole of the other of the first and second plurality.

The above solution permits to achieve the following advantages: lower noise than the first prior art (FIGS. 1A and 1B) solution at all flow regimes and lower noise than the second prior art (EP1408265) solution at partial valve opening.

BRIEF DESCRIPTION OF THE DRAWINGS

Other object features and advantages of embodiments of the present invention will become evident from the following description of the embodiments of the invention taken in conjunction with the following drawings, wherein:

FIGS. 4 and 5 are detailed views of the component in FIG. 3a.

DETAILED DESCRIPTION

Figure 1A:
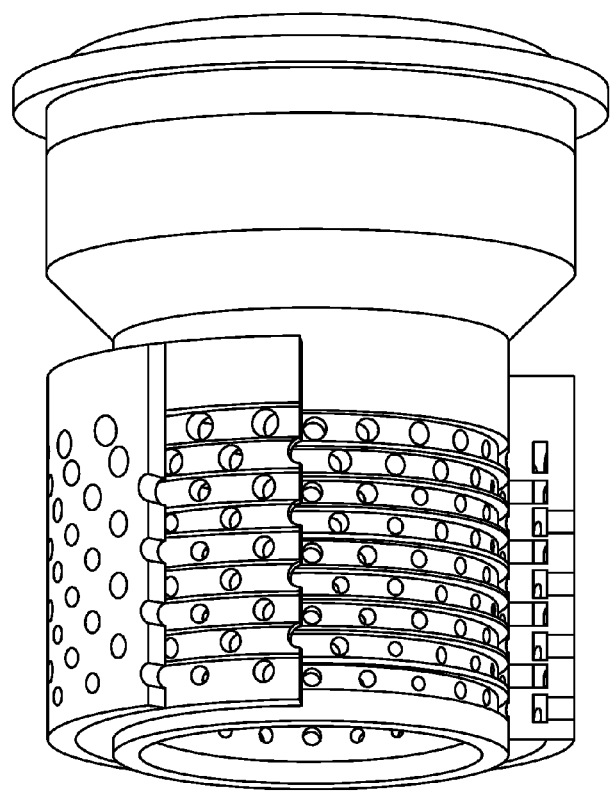
FIGS. 1A and 1B are, respectively, an assonometric and a sectional view of a component of a valve according to the prior art.
Figure 1B:
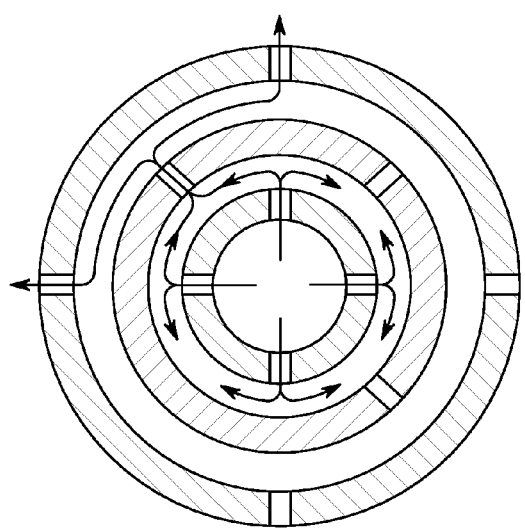

With reference to first embodiment of the present invention (FIGS. 2, 3A, 4 and 5), a control multistage valve 1 comprises a cylindrical hollow trim 2 extending along a longitudinal axis Y and a plug 6 sized to fit inside the bore 5 and slidably movable along the axis Y. The hollow trim 2 defines an inner bore 5 oriented along the axis Y between a first circular opening 3 and a second circular opening 4. The first opening 3 defines an inlet of the valve 1. The trim 2 comprises a first outer cylinder 11 extending along the axis Y and comprising a first plurality 14 of radial through holes defining an outlet of the valve 1. The trim 2 also comprises a second cylinder 12, housed in the first cylinder 11 and coaxial with it. The second cylinder 12 comprises a second plurality 15 of radial through holes.

The plug 6 slides between a closed position proximal to the first opening 3 and a complete open position proximal to the second opening 4, through a plurality of partially open positions. In the complete open position all the holes of the first and second plurality 14, 15 of through holes are in communication with the inner bore 5. In each of the partially open positions only a respective portion of holes of the first and second plurality 14, 15 of through holes are in communication with the inner bore 5.

Figure 2:
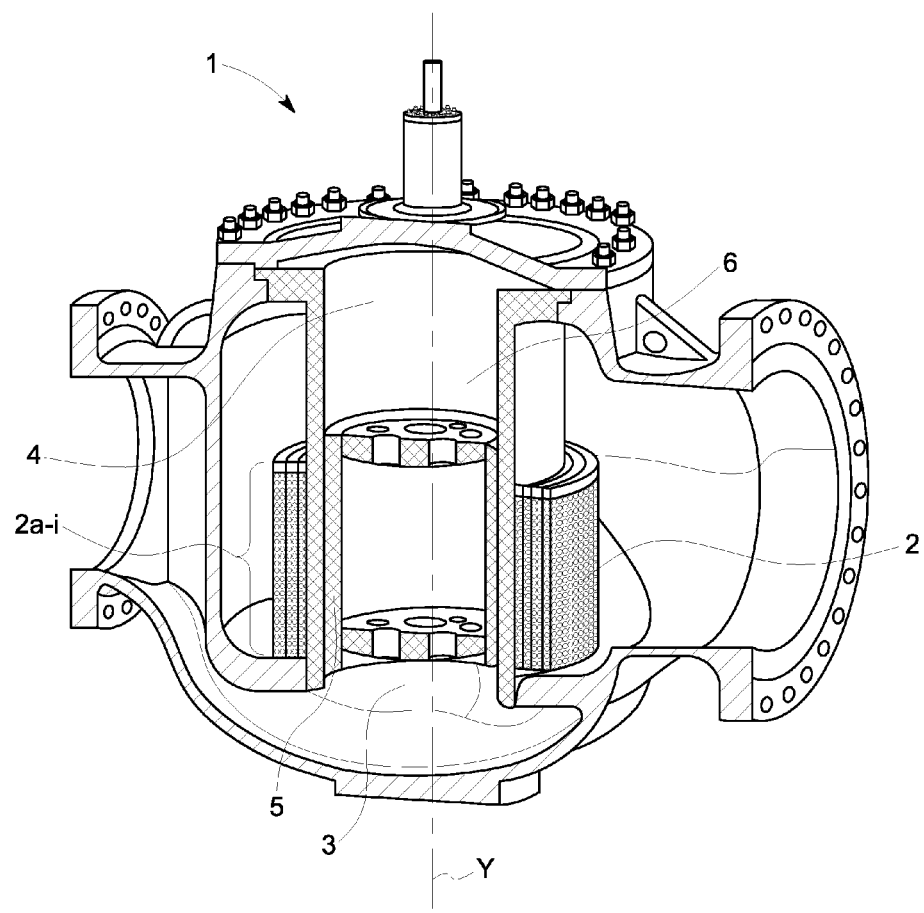
FIG. 2 is a sectional assonometric view of a valve according to the present invention.
Figure 3A:
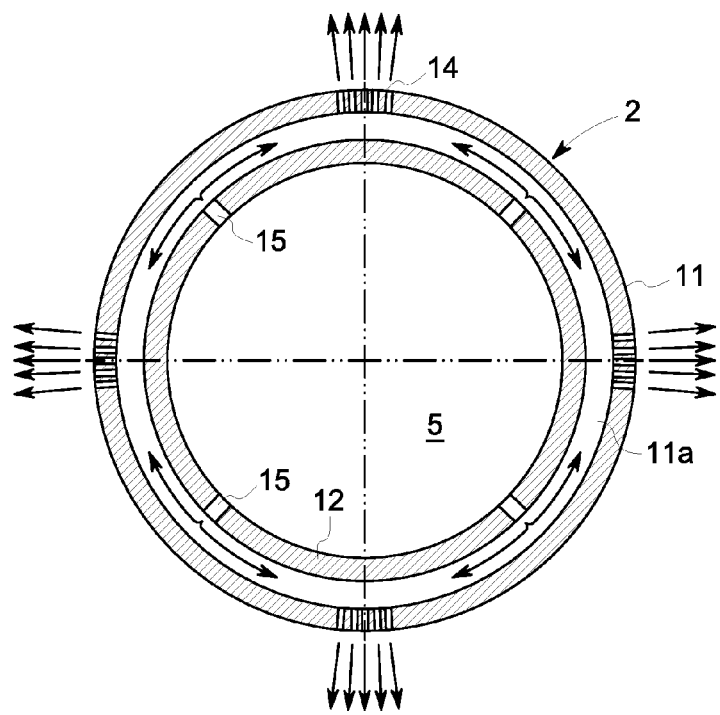
FIGS. 3A and 3B are, respectively, two sectional views of two different embodiments of a component of the valve in FIG. 2.
Figure 3B:
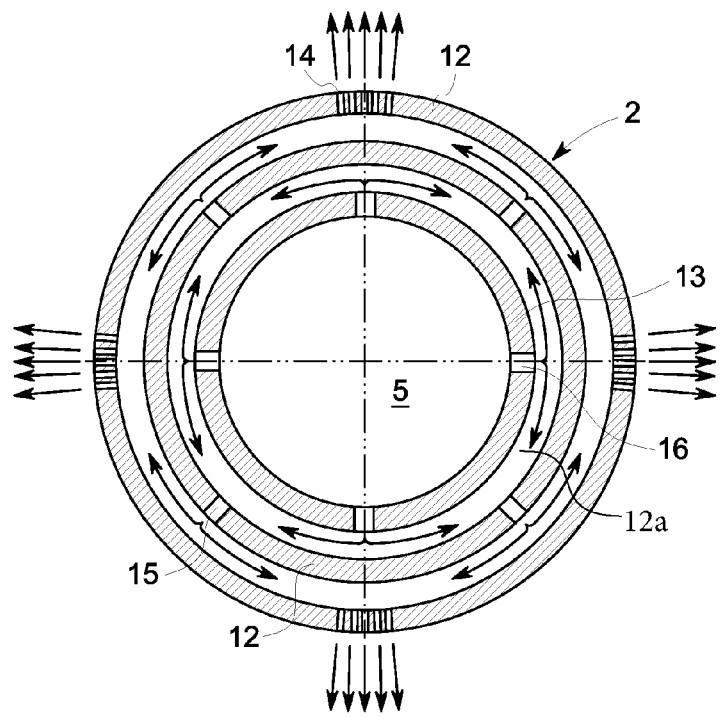
Figure 4:
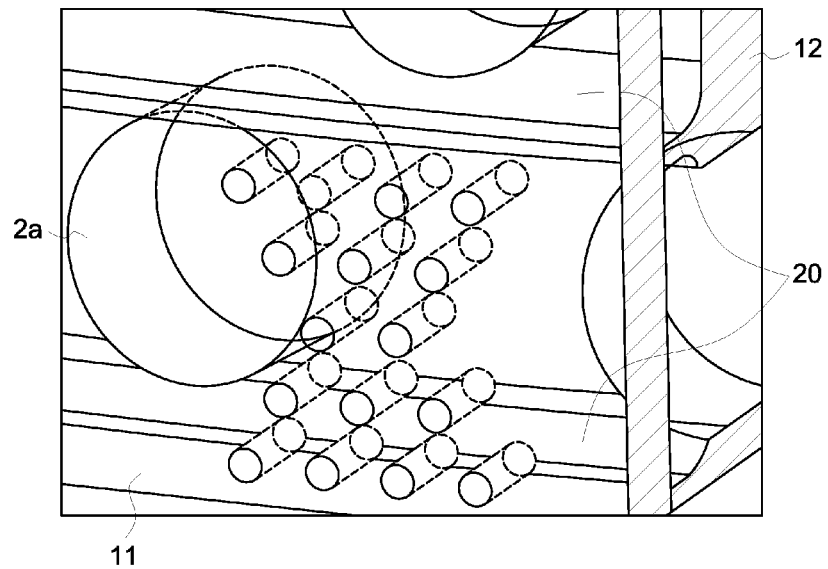
Figure 5:
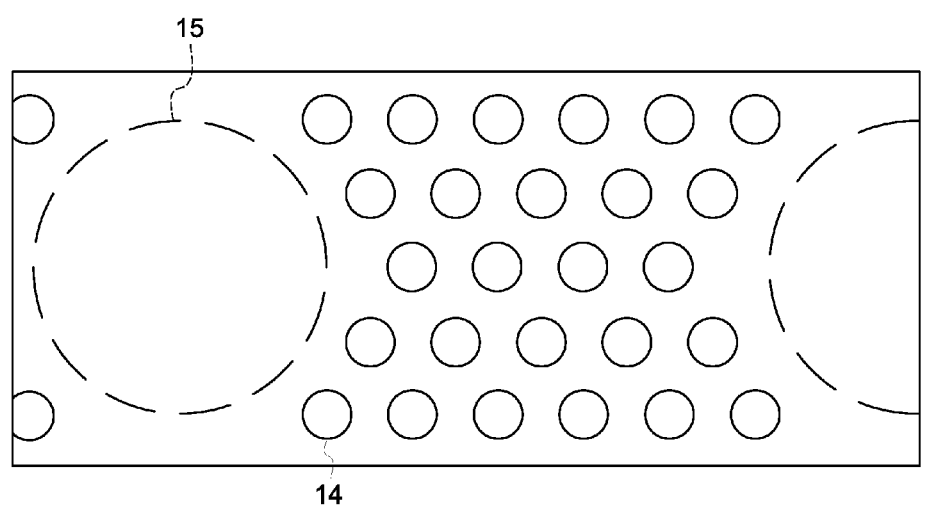

The trim 2 further comprises a plurality of annular partition walls 20 orthogonal to the axis Y and extending through an annular interspace 11a from one to the other of the first and second cylinder 11, 12 in order to divide the trim 2 into a plurality of levels (nine levels 2A-I) in the embodiments of the attach FIG. 2-4) axially distributed along the axis Y between the first and second openings 3, 4. Each level 2A-I comprises respective portions of the first and second cylinder 11, 12 and respective portions of the first and second plurality of holes 13, 14. Each of the levels 2A-I defines one of the partially open positions.

In the first embodiment of the present invention, the valve 1 comprises two stages and the trim 2 comprises exclusively the first and the second cylinder 11, 12. When the valve 1 is fully or partially open, i.e. when the plug 6 is remote from the first opening 3, a fluid flows from the first opening 3 to at least part of the levels 2A-I by reducing its energy pressure. Dividing the trim 2 in several levels a more efficient reduction of pressure is achieved as well as a reduction of noise. The fluid passes first through the second inner cylinder 12 which constitutes a first stage of pressure drop, then through the annular interspace 11A and finally through the first outer cylinder 11 which constitutes a second and last stage of pressure drop.

The holes of the first and second plurality 13, 14 are dimensioned and positioned in such a way that: the first plurality 14 are smaller in diameter than the holes of the second plurality 15, the holes of the first plurality 14 are in greater number than the holes of the second plurality, for each hole 14, 15 of one of the first and second cylinders 11, 12 the projection along a radial direction on the other of the first and second cylinders 12, 11 is spaced from each hole 15, 14 of the other of the first and second plurality of holes.

For the above configuration the holes of the first plurality 14 is neither partially aligned, along a radial direction orthogonal to the axis Y, with the holes of the second plurality 15.

The holes of the first and second plurality 13, 14 are further dimensioned and positioned in such a way that: the distance 1 between the centres of two adjacent holes 14 of the first plurality is comprised between 1.3D and 3D, where d is the average diameter of the holes of the first plurality 14. In particular, according to a possible embodiment of the present invention, the holes of the first plurality 14 have all the same diameter d; in each level 2A-I the total cross-sectional area A of the holes of the first plurality 14 is comprised between 1.1B and 3B, where B is the total cross-sectional area B of the holes of the second plurality of holes 15.

In a second embodiment of the present invention (FIG. 3B), the valve 1 comprises three stages and the trim 2 comprises also a third cylinder 13 housed in the second cylinder 12 and coaxial with it. The third cylinder 13 comprises a third plurality 16 of radial through holes. Analogously to the first and second cylinder 11, 12, also the holes of the couple of adjacent cylinders constituted by the second and third cylinder 12, 13 are disposed in such a way that for each hole of one of the second and third cylinders the projection along a radial direction on the other of the second and third cylinders is spaced from each hole of the other of the second and third plurality of holes. The trim of the second embodiment comprises a second annular interspace 12A from one to the other of the second and third cylinder 12, 13.

In such second embodiment, fluid flows from the first opening 3 to at least part of the levels 2A-I by reducing its energy pressure. The fluid passes first through the third cylinder 13, which constitutes a first stage of pressure drop, and then through the second annular interspace 12A. From the second annular interspace 12A the fluid passes to the second inner cylinder 12 which constitutes a second stage of pressure drop, then through the annular interspace 11A and finally through the first outer cylinder 11 which constitutes a third and last stage of pressure drop.

According to other embodiments (not shown) the valve 1 comprises four or more stages and the trim 2 comprises four or more cylinders each corresponding to a respective stage of pressure drop.

In general, for all the embodiments, it however necessary that the holes of the first and second plurality 13, 14 are further dimensioned and positioned in such a way that the above conditions a), b) and c) are fulfilled.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A control valve comprising:
a cylindrical hollow trim defining an inner bore extending along an axis between a first opening and a second opening, the first opening defining an inlet of the valve, the cylindrical hollow trim comprising:
a first outer cylinder extending along the axis and comprising a first plurality of radial through holes defining an outlet of the trim,
a second cylinder, housed in the first cylinder and coaxial therewith, the second cylinder comprising a second plurality of radial through holes; and
a plug sized to fit inside the bore and slidably movable along the axis between a closed position proximal to the first opening and a complete open position proximal to the second opening, through a plurality of partially open positions, wherein in the complete open position all the holes of the first and second plurality of through holes are in communication with the inner bore and wherein in each of the partially open positions only a respective portion of holes of the first and second plurality of through holes are in communication with the inner bore,
wherein the holes of the first plurality are smaller in diameter than the holes of the second plurality,
wherein the holes of the first plurality are in greater number than the holes of the second plurality, and each hole of one of the first and second cylinders of a projection along a radial direction on the other of the first and second cylinders is spaced from each hole of the other of the first and second plurality,
wherein the cylindrical hollow trim further comprises a plurality of annular partition walls orthogonal to the axis and extending through an annular space from one to the other of the first and second cylinder in order to divide the trim into a plurality of levels axially distributed along the axis between the first and second openings, each of the levels defining one of the partially open positions.

2. The control valve according to claim 1, wherein the cylindrical hollow trim further comprises at least a third cylinder housed in the second cylinder and coaxial therewith, the at least third cylinder comprising a respective third plurality of radial through holes, the holes of each couple of adjacent cylinders in the cylindrical hollow trim being disposed in such a way that for each hole of one of the adjacent cylinders of the projection along a radial direction on the other of the adjacent cylinders is spaced from each hole of the plurality of holes on the other of the adjacent cylinders.

3. The control valve according to claim 1, wherein the distance between the centres of two holes of the first plurality is greater than 1.3d and lower than 3d, where d is the average diameter of the holes of the first plurality.

4. The control valve according to claim 3, wherein the holes of the first plurality have all the same diameter.

5. The control valve according to claim 1, wherein in each level the total cross-sectional area of the holes of the first plurality is greater than 1.1B and lower than 3B, where B is the total cross-sectional area of the holes of the second plurality.

6. The control valve according to claim 2, wherein the distance between the centres of two holes of the first plurality is greater than 1.3d and lower than 3d, where d is the average diameter of the holes of the first plurality.

* * * * *